(12) United States Patent
Fout et al.

(10) Patent No.: US 7,429,327 B2
(45) Date of Patent: Sep. 30, 2008

(54) CLARIFYING TANK

(75) Inventors: Gary Fout, Cypress, TX (US); Neale Browne, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 11/958,866

(22) Filed: Dec. 18, 2007

(65) Prior Publication Data

US 2008/0093281 A1    Apr. 24, 2008

Related U.S. Application Data

(62) Division of application No. 10/916,850, filed on Aug. 12, 2004, now Pat. No. 7,332,097, which is a division of application No. 10/266,123, filed on Oct. 8, 2002, now Pat. No. 6,793,814.

(51) Int. Cl.
*B01D 19/00* (2006.01)
*B01D 21/26* (2006.01)

(52) U.S. Cl. .................. 210/512.3; 210/188; 210/512.1; 209/725; 209/733

(58) Field of Classification Search ................ 210/188, 210/512.1, 512.3, 788, 800, 803; 209/725, 209/733
See application file for complete search history.

(56) References Cited

U.S. PATENT DOCUMENTS

| | | |
|---|---|---|
| 2,425,110 A | 8/1947 | McCurdy |
| 2,806,599 A | 9/1957 | Patrick |
| 3,807,568 A | 4/1974 | Ruthrof |
| 3,923,652 A | 12/1975 | Condolios et al. |
| 4,153,558 A | 5/1979 | Frykhult |
| 4,306,967 A | 12/1981 | Trautwein |
| 4,476,980 A | 10/1984 | Giffard |
| 4,966,703 A | 10/1990 | Kalnins et al. |
| 4,994,179 A | 2/1991 | Keeter et al. |
| 5,066,388 A | 11/1991 | Ross |

(Continued)

FOREIGN PATENT DOCUMENTS

| | | |
|---|---|---|
| JP | 07024218 A | 1/1995 |
| JP | 08299967 A2 | 11/1996 |

OTHER PUBLICATIONS

International Search Report mailed Apr. 14, 2004 for International Application No. PCT/US2003/032088.

(Continued)

*Primary Examiner*—David A Reifsnyder

(57) ABSTRACT

Methods and apparatus for separating solid particles from a fluid. One preferred embodiment includes a tank for settling particles out of the fluid, a conical chamber at the bottom of the tank, an outlet connected to conical chamber, and a conical auger within the conical chamber. The tank may have a tangential inlet that creates a fluid circulation that exerts a centrifugal force on the solid particles to increase the settling of particles out of the fluid. The tank may have a static spiral on the inner wall that helps small particles coalesce into larger particles that settle faster out of the fluid. The fluid content of the solids removed from the tank may be controlled by varying the rotational speed of the conical auger. The rotational speed of the conical auger may be varied depending on the torque required to rotate the conical auger.

10 Claims, 6 Drawing Sheets

U.S. PATENT DOCUMENTS

| | | | |
|---|---|---|---|
| 5,078,875 A | 1/1992 | Losing | |
| 5,116,488 A | 5/1992 | Torregrossa | |
| 5,344,255 A | 9/1994 | Toor | |
| 5,403,473 A | 4/1995 | Moorehead et al. | |

OTHER PUBLICATIONS

Machine Translation of JP-07024218A.

Office Action mailed Jun. 14, 2007 for Canadian Patent Application No. 2,501,623.

CLARIFYING TANK

CROSS-REFERENCE TO RELATED APPLICATIONS

This application is a divisional of U.S. application Ser. No. 10/916,850, filed Aug. 12, 2004, entitled, "Clarifying Tank," now issued U.S. Pat. No. 7,332,097 which is a divisional of U.S. application Ser. No. 10/266,123, filed Oct. 8, 2002, now issued U.S. Pat. No. 6,793,814. The contents of said applications are incorporated herein by reference.

BACKGROUND OF THE INVENTION

The separation of solid particles from fluids is an important consideration in many industries from heavy construction to wastewater treatment. One industry in which the separation of solids from fluids is very important is rotary drilling. Rotary drilling techniques are used extensively in drilling hydrocarbon wells, water wells, and mining applications. In rotary drilling, a fluid, known as drilling mud, is circulated down a drill string, through a drill bit, and back up the borehole to the surface. The drilling mud acts as a lubricant for the drill bit and carries cuttings from the bottom of the borehole to the surface.

Most rotary drilling applications also rely on the drilling mud to control underground pressures developed by the formation fluids. Therefore, the density of the drilling mud is closely maintained in order to control the hydrostatic pressure that the mud exerts at the bottom of the well. If the mud is too light, formation fluids, which are at higher pressures than the hydrostatic pressure developed by the drilling mud, can enter the wellbore and flow uncontrolled to the surface, possibly causing a blowout. If the mud is too heavy, then the hydrostatic pressure excited at the bottom of the wellbore can reduce the rate at which the drill bit will drill the hole. Thus, the control of the solids content of the drilling fluid is very crucial to the overall efficiency and safe operation of the rig.

The cleaning and conditioning of drilling mud at the surface normally includes a series of solids control equipment, which may include shale shakers that remove large particles from the drilling mud, desilters and/or desanders that remove smaller particles, degassers that remove entrained gas, mud-gas separators to remove free gas, and dewatering equipment to reclaim drilling fluid while reducing hauloff. Clarifying tanks are also used in the cleaning and conditioning of drilling mud and, depending on their specific design, can be used for a variety of functions, such as large particle removal and fine solids dewatering.

One type of clarifying tank utilizes a cylindrical vessel into which drilling fluid is injected through a tangential nozzle, which causes the fluid to spin inside the tank. This spinning motion creates a vortex, which imparts centrifugal forces onto any solid particles within the fluid. These centrifugal forces move the particles away from the center of the tank, thus leaving a relatively clean fluid at the center. Any free gas will also migrate to the center of the vortex. A centrally located outlet near the top of the tank can then be utilized to withdraw the substantially clean fluid from the tank. The solid particles that are pushed to the outside of the circulating fluid are allowed to fall to the base of the tank where they can be collected and removed for recycling or disposal.

Some clarifying tanks have conical bottoms that collect solids and direct the particles toward a centrally located outlet where they can be removed from the tank. The outlet, typically located at the apex of the conical bottom, is often fitted with a valve that can be opened and closed to regulate the flow of solids exiting the tank. It is often desired to remove the collected solid particles from the tank without removing an excess of fluid. The valve can be used to control the characteristics of the material that is removed from the tank. One problem with some prior art configurations is that the opening and closing of the valve must be closely monitored to ensure the efficient removal of solids from the tank. If the valve remains open for too long, all of the accumulated solids may flow out of the tank and excess fluid will be lost through the outlet. If the valve is left closed for too long, the solids will build up in the bottom of the tank and may not flow once the valve is opened.

Thus, there remains a need in the art for methods and apparatus for separating solid material from a fluid. Therefore, the embodiments of the present invention are directed to methods and apparatus for separating solids that seek to overcome these and other limitations of the prior art.

SUMMARY OF THE PREFERRED EMBODIMENTS

Accordingly, there are provided herein methods and apparatus for separating solid particles from a fluid. One embodiment includes a tank in which solid particles are allowed to settle out of a fluid and are collected in a conical chamber at the bottom of the tank. The conical chamber has an outlet and may include a conical auger within the chamber to move the solid particles through the outlet. The tank preferably has a tangential inlet that creates a fluid circulation in order to exert centrifugal forces fluid in order to increase the separation of the heavy solid particles from the relatively light fluid. The tank may also have a static coalescing spiral on the inner wall that helps small particles combine to form larger particles that settle faster out of the fluid.

In some, applications, the solid particles that settle out of the fluid and fill the conical chamber may form a plug between the tank and the conical chamber that prevents the free flow of fluid into the conical chamber. The conical auger rotates and moves a portion of the solid particles through the outlet with each rotation. The solid particles moved by the conical auger are further compressed as they travel toward the outlet.

An alternative embodiment includes a method of separating solid particles from a fluid by settling the particles out of the fluid in a tank and removing the settled solid particles from the bottom of the tank with a conical auger. The solid particles may also be compressed by the conical auger as the particles are moved toward the outlet. This additional compression of particles further helps to control the liquid content of the material removed from the tank. The material removed from the tank may also be controlled by varying the rotational speed of the conical auger. As the speed of the conical auger increases, more solids are removed from the tank. In certain embodiments, the rotational speed of the conical auger may be varied depending on the torque required to rotate the conical auger.

Depending somewhat on the viscosity of the material removed from the tank, certain embodiments may use additional material handling equipment to move the material once it has left the system. Certain embodiments may use a positive displacement pump or a horizontal screw-type auger to further move the solid material away from the tank and position the material for further processing or handling. Some applications using this additional handing equipment outside the clarifying tank may operate without the use of an internal conical auger.

Alternative embodiments may also provide for the collection of any free gas that may be contained within the fluid by way of a degassing system disposed at the top of the tank. Free gas in the fluid entering the tank will, when subjected to centrifugal forces, tend to collect at the center and move to the top of the tank along with the substantially clean fluid. The degassing system provides a controlled space where gas can be removed from the system free of substantial quantities of liquids. Preferred embodiments of the degassing system provide a return line for returning excess liquid to the system.

Thus, the present invention comprises a combination of features and advantages that enable it to substantially increase the efficiency of separating solid particles from a liquid. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
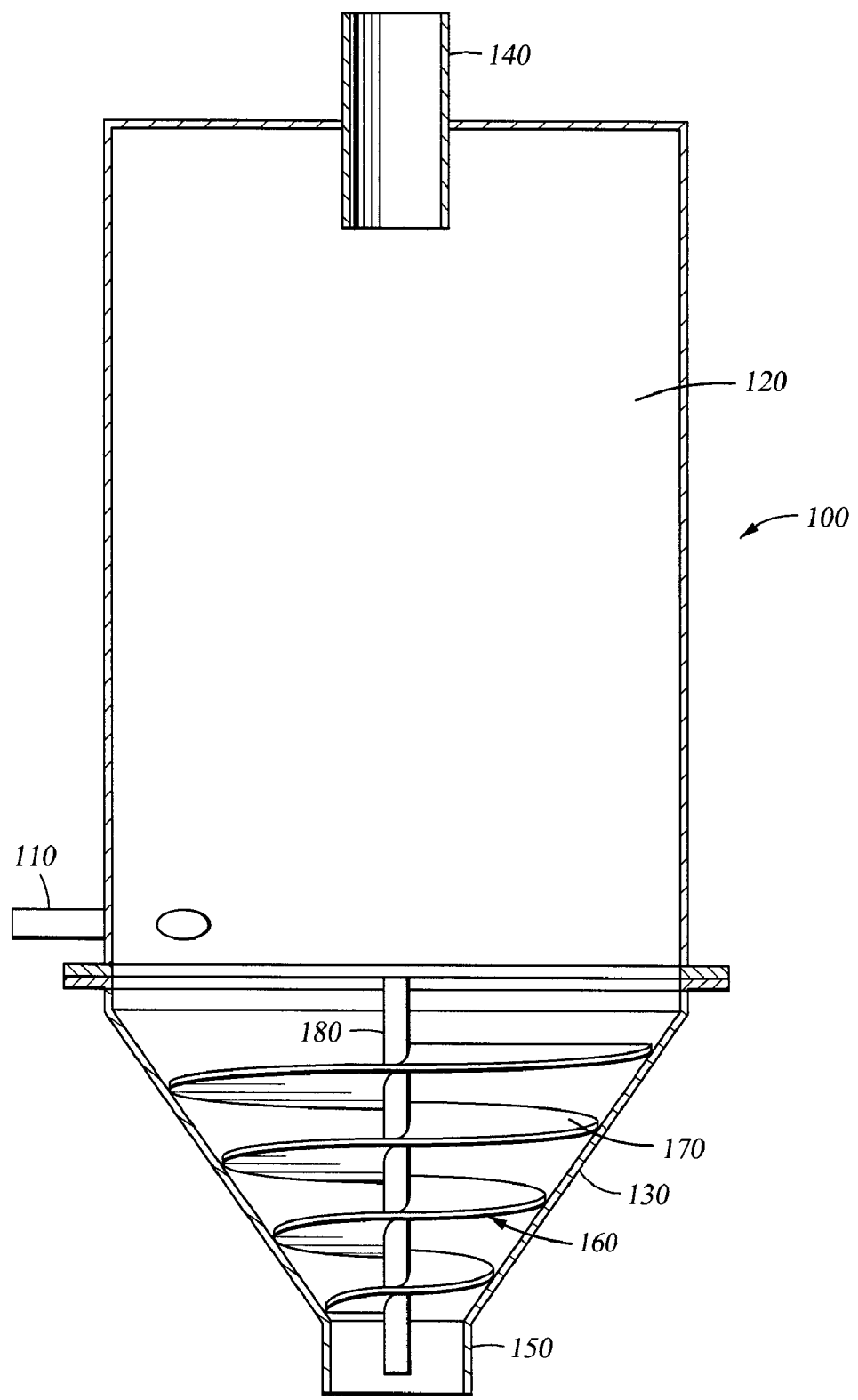
FIG. 1 is a schematic diagram of one embodiment of a clarifying tank having a conical auger.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The preferred embodiments of the present invention relate to methods and apparatus for separating solid material from a fluid. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In particular, various embodiments of the present invention provide a number of different methods and apparatus for separating drilling solids from a drilling fluid. Reference is made to the application of the concepts of the present invention to rotary drilling technology, and in particular to the drilling of hydrocarbon wells, but the use of the concepts of the present invention is not limited to drilling applications, and can be used for any other application in which solid material is removed from a fluid. It is to be fully recognized that the different teachings of the embodiments discussed below may be employed separately or in any suitable combination to produce desired results.

FIG. 1 is a simplified schematic representation of a clarifying tank 100 having a tangential fluid inlet 110, a cylindrical portion 120, conical portion 130, fluid outlet 140, and a solids outlet 150. A conical auger 160 is disposed within conical portion 130 and includes a conical auger blade 170 that is rotated by applying torque to central shaft 180. Tank 100 may be of any size desired for a given application. One preferred tank 100 has a diameter of approximately eight feet, a cylindrical portion 120 having a height of approximately twelve feet, and a conical portion 130 having a height of approximately four feet.

Fluid enters tank 100 through tangential fluid inlet 110 into cylindrical portion 120. Once cylindrical portion 120 of tank 100 is full of fluid, the spinning motion imparted on the fluid by tangential inlet 110 creates a vortex within the fluid that creates centrifugal forces that move the solid particles within the fluid toward the wall of the tank. The fluid that is near the center of tank 100 will thus become relatively free of solid particles and can be removed through fluid outlet 140 as a substantially clean fluid.

Fluid outlet 140 is preferably located in the center of the top of tank 100 and may include piping that extends into cylindrical portion 120 so as to only draw fluid from the clean center of the vortex. Outlet 140 is preferably sized so as to not hold backpressure on tank 100.

The solid particles that are moved toward the wall of tank 100 will, given sufficient time, tend to settle under gravitational force toward the bottom of the tank and conical portion 130. In certain applications, as the solid particles settle into conical portion 130 they will form a thick cake material. This cake material is compressed by the hydrostatic head and elevated pressure of the fluid within cylindrical portion 120. The compression acts to force fluid out of the cake material such that the cake forms a plug separating cylindrical portion 120 and conical portion 130 that prevents the free flow of liquids through outlet 150. In some embodiments, a vortex breaker may be provided near the junction between cylindrical portion 120 and conical portion 130 so as to reduce the effects of the fluid vortex on the settled solids plug.

Once sufficient cake material has settled and formed a plug between cylindrical portion 120 and conical portion 130, conical auger 160 may then by used to further compress and remove the solids from tank 100 through solids outlet 150. Conical auger 160 is preferably shaped to conform closely to the inside surface of conical portion 130. Conical auger 160 is turned by rotating shaft 180 such that material is moved toward outlet 150 by conical auger blade 170.

One preferred embodiment of conical auger blade 170 may have four flights, with an equal spacing of about one foot between flights. Because the effective diameter of conical auger 160 decreases toward outlet 150, the solid particles will be increasingly compressed as they are moved by the conical auger toward the outlet. Shaft 180 may be turned by a hydraulic, pneumatic, electric, or any other torque inducing power source. Conical auger 160 may rotate at any speed required for desired solids removal. A preferred conical auger speed is between 5 and 50 rpm.

It is preferred that the rotational speed of conical auger 160 be controllable so that the speed can be adjusted as the composition of the fluid and solid changes so as to maintain the characteristics of the solids leaving tank 100. In this manner, the torque developed by conical auger 160 provides a means for controlling the rotational speed of the conical auger, therefore controlling the dryness of the solids produced through outlet 150.

As conical auger 160 removes fluid from the solid plug between cylindrical portion 120 and conical portion 130, it compresses the solids, which forces additional fluid out of the solids and back into cylindrical portion 120. In order to ease the movement of fluid from conical auger 160 back into cylindrical portion 120, conical auger blade 170 may include dewatering holes through the blade that enable fluids to flow from the lower portions of the conical auger and allow a drier solid product to be produced.

Figure 2:
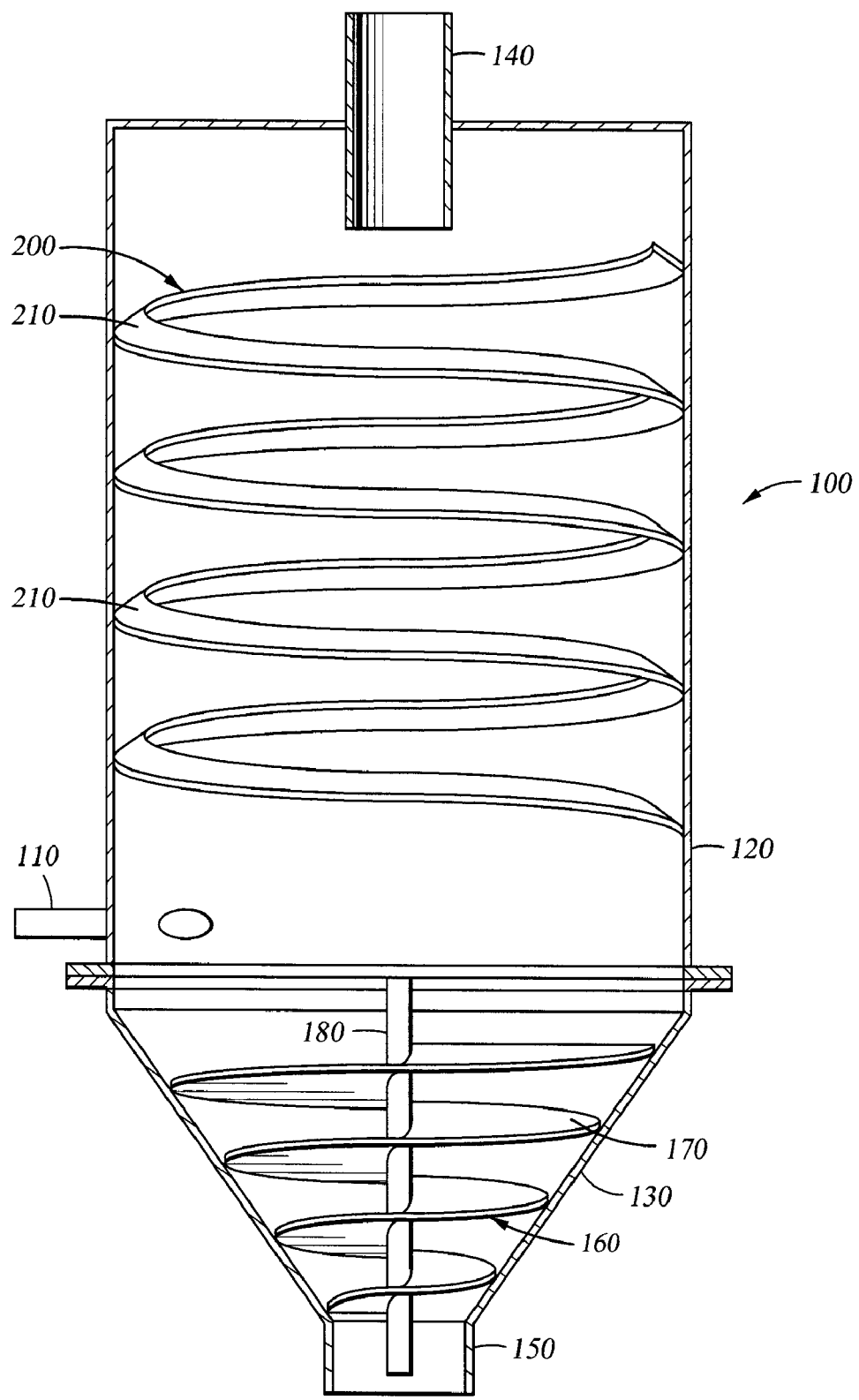
FIG. 2 is a schematic diagram of a second embodiment of a clarifying tank having a conical auger and an static coalescing spiral.

FIG. 2 depicts clarifying tank 100 of FIG. 1 having a static coalescing spiral 200 disposed within cylindrical portion 120. Spiral 200 has a series of flights 210 that are attached to the inside of tank 100 extend into the rotating fluid within the tank. In a tank having a diameter of eight feet, flights 210 may extend approximately 4" from the wall of tank. Spiral 200 runs in the opposite direction of the flow of fluid and flights 210 are preferably inclined upward.

As the fluid moves through tank 100, centrifugal forces move the solid particles suspended in the fluid toward the outside wall of the tank where they impact spiral 200. Small particles, which may be resistant to sedimentation due to the viscosity of the fluid, will ride in the fluid and will contact the underside of flights 210. As these small particles contact spiral 200 and slow down, the small particles will tend to combine to form larger particles that will settle out of the fluid, under the force of gravity, and ride spiral 200 to the bottom of tank 100. Thus, spiral 200 serves to increase the rate of settlement within tank 100.

Figure 3:
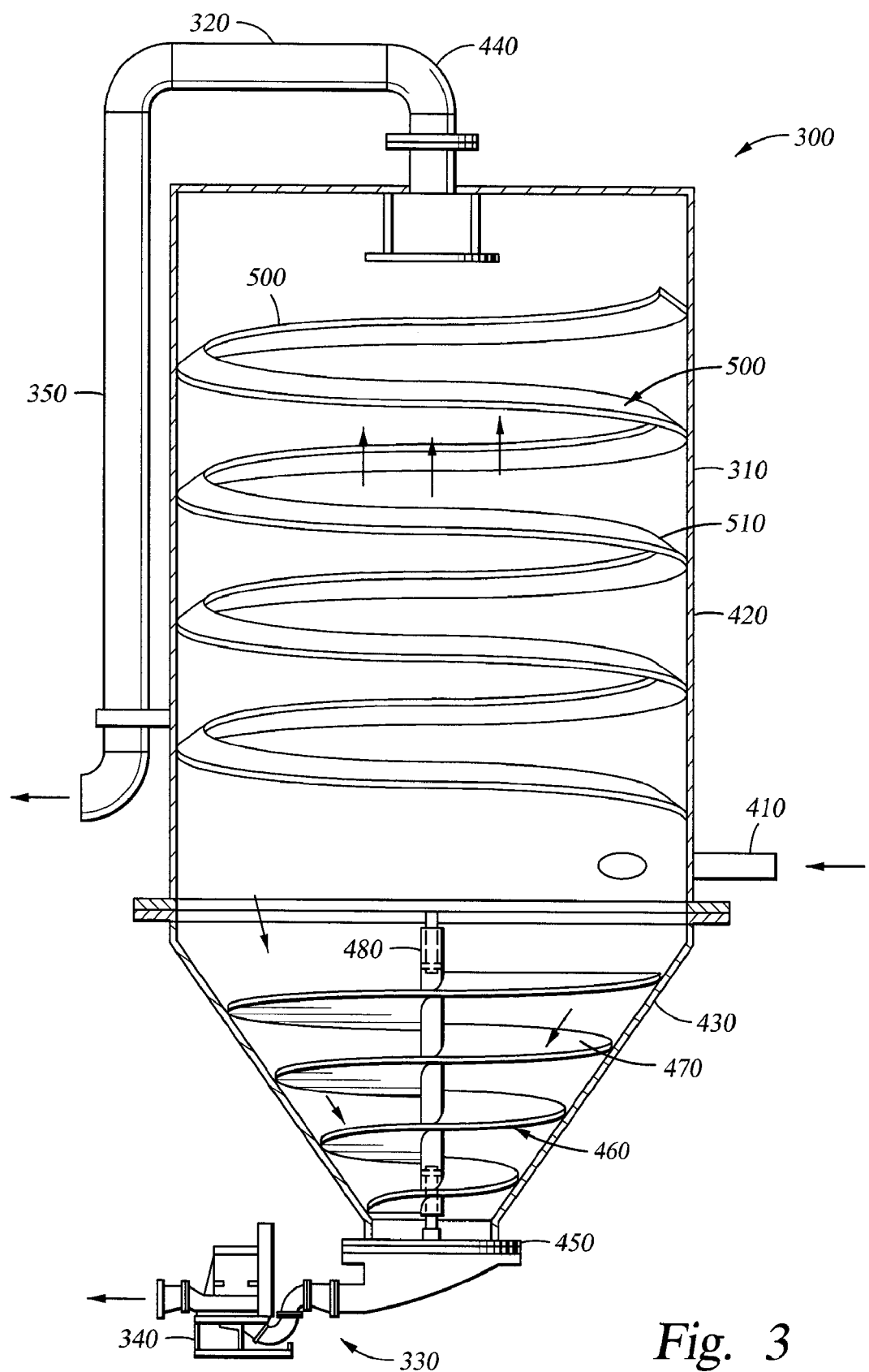
FIG. 3 is a schematic diagram of a clarifying tank system having a conical auger with a pump assisted output.

FIG. 3 is a schematic representation of a clarifying tank system 300 including a clarifying tank 310, a fluid handling system 320, and a solids handling system 330. Clarifying tank 310 includes a tangential fluid inlet 410, a cylindrical portion 420, conical portion 430, fluid outlet 440, and a solids outlet 450. A conical auger 460 is disposed within conical portion 430 and includes a conical auger blade 470 that can be rotated by applying torque to central shaft 480.

Fluid enters tank 310 through tangential fluid inlet 410 creating a vortex within the fluid that generates centrifugal forces that tend to move the solid particles within the fluid toward the wall of the tank. The fluid that remains near the center of tank 310 will thus become relatively free of solid particles. Fluid outlet 440 is provided to remove this substantially clean fluid from the center of tank 310.

Fluid outlet 440 is preferably located in the center of the top of tank 310 and may include piping that extends into cylindrical portion 420 so as to only draw fluid from the clean center of the vortex. Outlet 440 is preferably sized so as to not hold back-pressure on tank 310. Outlet 440 is connected to fluid handling system 320 that includes fluid conduit 350.

Tank 310 may also include a static coalescing spiral 500 having a series of flights 510 that are attached to the inside of tank 310. Flights 510 are preferably inclined upward and extend into the rotating fluid within the tank and runs in the opposite direction of the flow of fluid. Static spiral 500 acts to coalesce smaller solid particles into larger particles that will settle out of the fluid at an increased rate. Static spiral 500 may be configured as described in relation to FIG. 2 or in any other configuration desired.

As the solid particles settle into conical portion 430, conical auger 460 may be used to further compress and push solids through outlet 450. Conical auger 460 is preferably shaped to conform closely to the inside surface of conical portion 430 and can be turned by rotating shaft 480. Conical auger 460 may be configured as described in relation to FIGS. 1 and 2 or any other conical auger configuration that may be effective given the particular separation process taking place.

Solids handling system 330 assists in the removal of solid material by drawing the material through outlet 450 by way of pump 340. Pump 340 is adapted to move the solid particles into a container (not shown) for storage or removal. One preferred pump 340 is a positive displacement pump, such as the dual plunger pump manufactured by Diadisk™. In the preferred pump, output is variable from 10-250 gpm and is dependant on factors such as rpm of the drive and the hydraulic properties of the suction and discharge piping. The preferred solids handling system 330 may employ a series of pumps in order to move larger volumes of solids.

Figure 4:
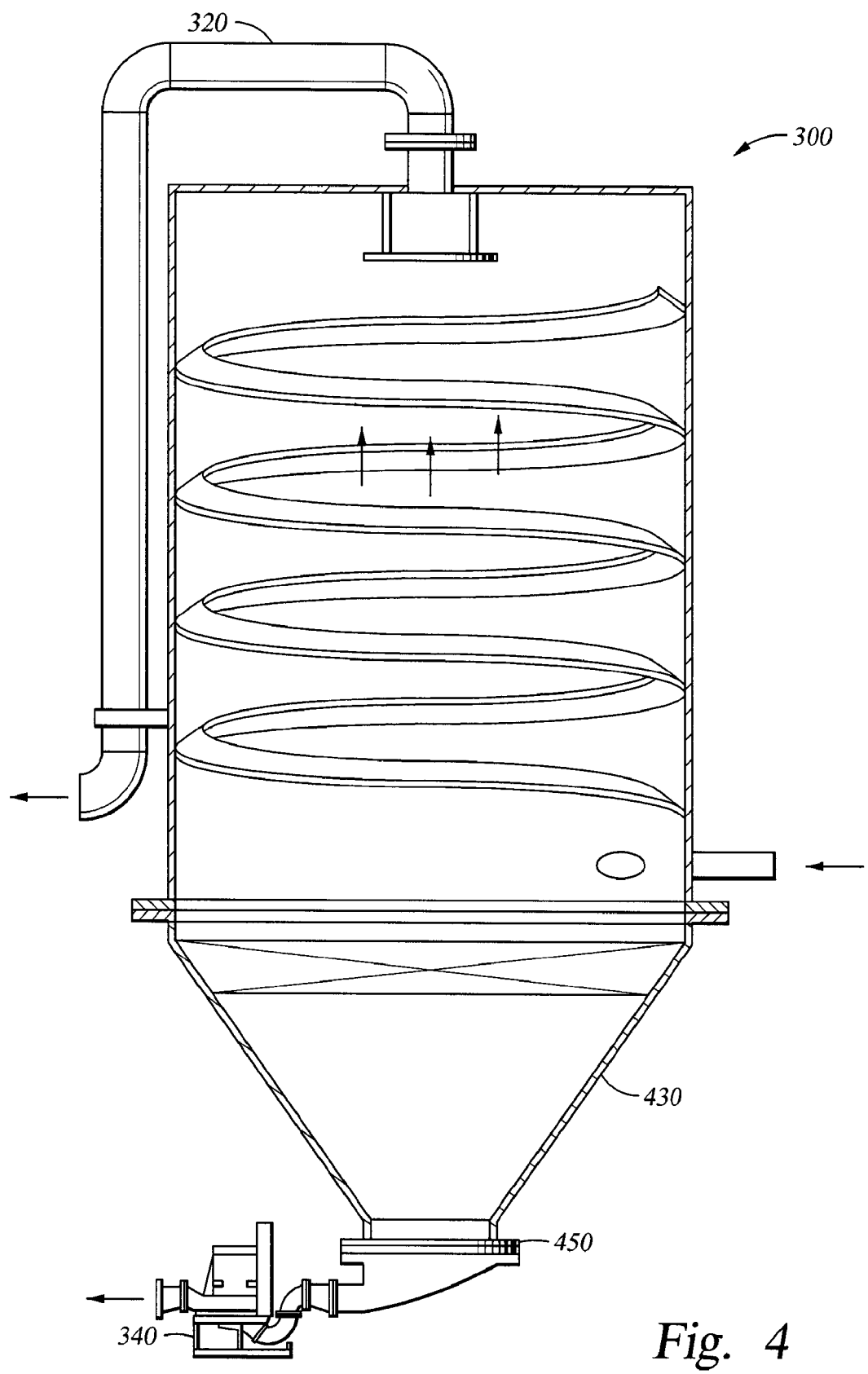
FIG. 4 is a schematic diagram of a clarifying tank system having a pump controlled output.

In certain applications, pump 340 may be able to operate without the need for conical auger 460. As shown in FIG. 4, pump 340 may be used to directly remove solids from conical portion 430. The pumping rate of pump 340 may be varied to control the quality of solids removed from the system.

Figure 5:
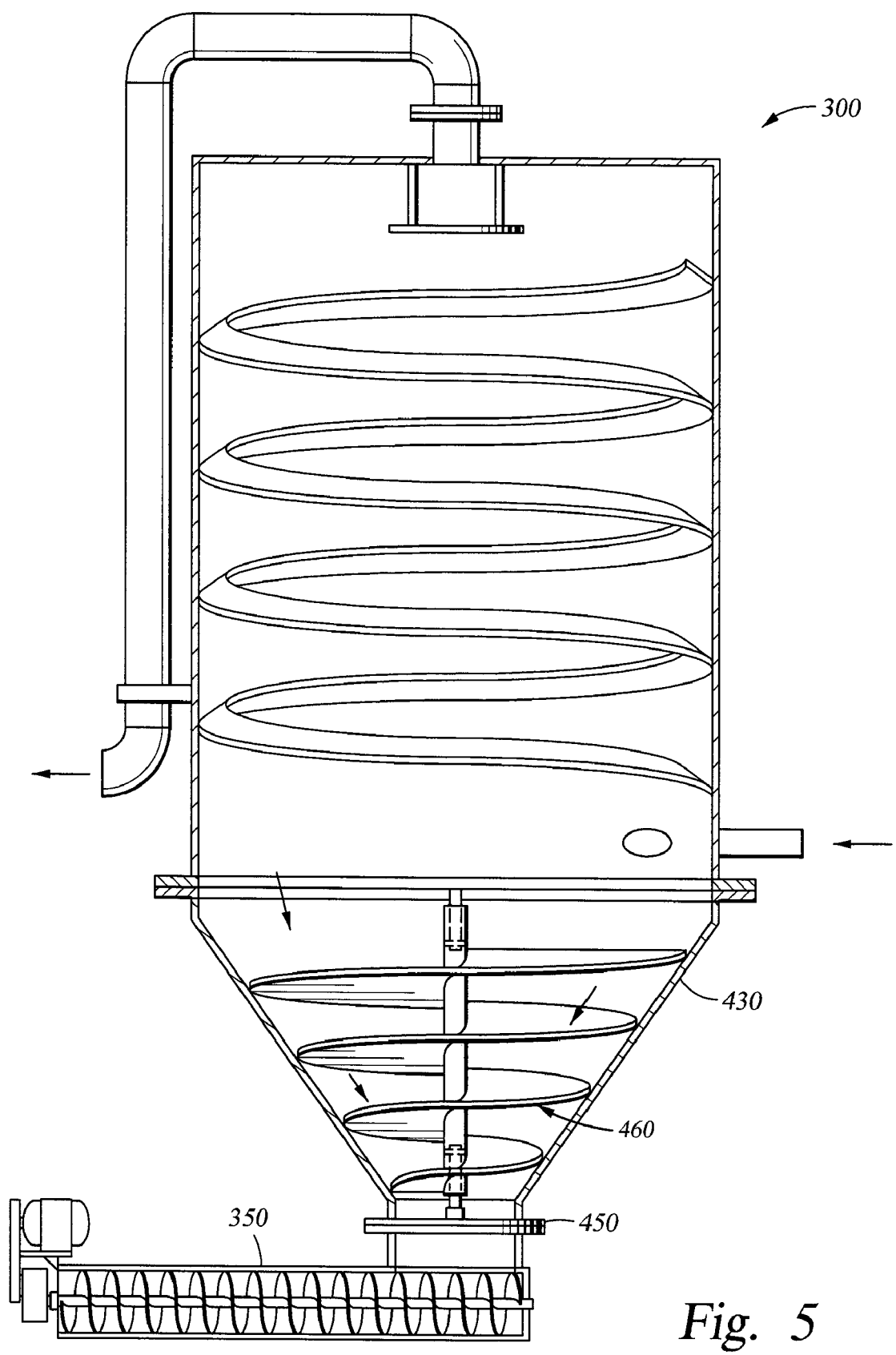
FIG. 5 is a schematic diagram of a clarifying tank system having a conical auger with a horizontal auger assisted output.

Referring now to FIG. 5, system 300 is shown having a horizontal auger 350 connected to the outlet from solids handling system 330 as an alternative to pump 340. Horizontal auger 350 is used to transport solid material away from outlet 450 for further handling. Horizontal auger 350 is preferably a standard screw auger, but other types of augers or conveyor systems could also be used. Although horizontal auger 350 is shown horizontal it is appreciated that auger 350 may be inclined as desired in order to elevate the solid material to ease further handling.

Figure 6:
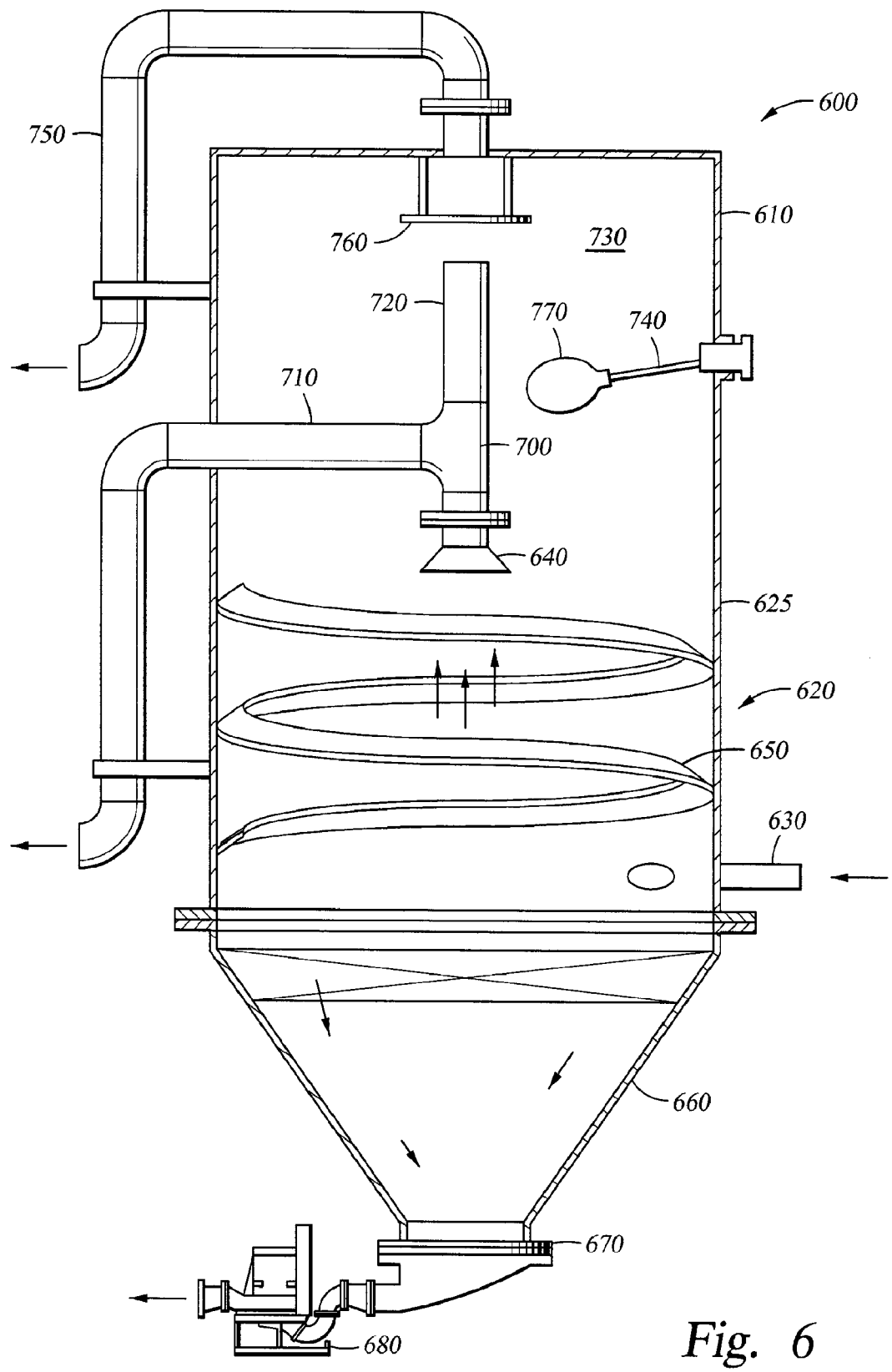
FIG. 6 is a schematic diagram of a clarifying tank system having a degassing system.

FIG. 6 depicts an alternative embodiment of a fluid processing system 600 having a degassing chamber 610 combined with a clarifying system 620. Degassing chamber 610 can be used with any clarifying system in which clean fluid and free gas are removed from the system through an outlet at the top of the system. Clarifying system 620 is shown as a system having a cylindrical tank 625 with a conical base portion 660 but may be any clarifying system having the desired characteristics.

In the embodiment shown in FIG. 6, fluid enters cylindrical tank 625 through a tangential fluid inlet 630 such that a vortex forms within the fluid. The spinning fluid creates centrifugal forces that move the solid particles within the fluid toward the wall of the tank where they contact static spiral 650, which helps move the particles to the base of the tank to improve the sedimentation of solid particles within the tank. Solid particles will settle into the conical base portion 660 where they are removed from the tank through outlet 670 by way of a pump 680, which may be used independently of or in combination with a conical auger (not shown). Thus, the fluid near the center of cylindrical tank 625 will be relatively free of solid particles. The centrifugal forces in the spinning fluid will also cause any free gas to collect at the center of the tank.

Outlet 640 is preferably located in the center of the top of tank 625 and provides a conduit into degassing chamber 610 from tank 625. Outlet 640 may include piping that extends into the rotating fluid and is preferably sized so as to not hold back-pressure on the fluid in tank 625. Free gas and substantially clean liquid will flow through outlet 640 into junction 700 where the fluid will be drawn laterally through fluid outlet 710 while the free gas continues through vent 720 into degassing chamber 610.

Degassing chamber 610 includes an enclosed gas compartment 730 into which gas will flow from vent 720. Gas is then removed from compartment 730 by way of vent pipe 750, which in some embodiments, may be connected to a flare or other gas disposal system. Vent pipe 750 may be disposed in any convenient location for withdrawing gas and is preferably at the top of compartment 730.

It is expected that some liquids will also flow through vent 720, especially when large quantities of gas are being processed. Therefore, splash guard 760 may be provided to prevent liquids from entering vent pipe 750. Gas compartment 730 may also preferably be equipped with an overflow device 740 for returning liquids to clarifying system 620 in a continuous or intermittent manner. Overflow device 740 may be a float 770 that opens a valve to return trapped liquid once the liquid reaches a certain level.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A system for separating solid particles from a liquid fluid comprising:
   a tank having a top and a bottom, wherein a portion of the solid particles settle out of the liquid fluid within the tank;
   a conical chamber having a larger diameter upper portion and a smaller diameter lower portion, wherein the larger diameter upper portion is connected to the bottom of said tank and is adapted to receive the settled solid particles;
   an outlet connected to the smaller diameter lower portion of said conical chamber;
   an auger disposed within said conical chamber wherein said auger is adapted to feed the settled solid particles to said outlet; and
   a tangential inlet, into said tank, wherein said tangential inlet is positioned between the top and bottom of said tank.

2. The system of claim 1, wherein fluid flowing through said inlet creates a fluid circulation that exerts a centrifugal force on the solid particles.

3. The system of claim 2 further comprising a liquid fluid outlet disposed at the top of said tank.

4. The system of claim 3 further comprising a degassing chamber in fluid communication with said liquid fluid outlet, wherein the degassing chamber includes a gas outlet and a fluids return.

5. The system of claim 4, wherein said degassing chamber is disposed above the top of said tank and comprises a gas outlet and fluids return.

6. The system of claim 5, wherein said degassing chamber further comprises a splash guard adapted to prevent fluids from entering the gas outlet.

7. The system of claim 5 further comprising an overflow device adapted to regulate the flow of fluid through the fluids return.

8. The system of claim 2 further comprising a static spiral disposed on the inside wall of said tank.

9. The system of claim 1 wherein said auger rotates and removes a portion of the solid particles in the plug with each rotation.

10. The system of claim 9 wherein the solid particles in said auger are further compressed as they are moved toward said outlet.

\* \* \* \* \*